(12) United States Patent
de Torres et al.

(10) Patent No.: US 9,333,818 B2
(45) Date of Patent: May 10, 2016

(54) METHOD AND SYSTEM FOR STORING AND DISPENSING COMPRESSED AIR

(71) Applicant: Roger de Torres, Denver, CO (US)

(72) Inventors: Roger de Torres, Denver, CO (US); Gregory Lundeen, Broomfield, CO (US); Ronald A. L. Rorrer, Highlands Ranch, CO (US)

(73) Assignee: Roger de Torres, Denver, CO (US)

( * ) Notice: Subject to any disclaimer, the term of this patent is extended or adjusted under 35 U.S.C. 154(b) by 292 days.

(21) Appl. No.: 13/937,735

(22) Filed: Jul. 9, 2013

(65) Prior Publication Data

US 2015/0013813 A1 Jan. 15, 2015

(51) Int. Cl.
*B60C 23/16* (2006.01)

(52) U.S. Cl.
CPC ........... *B60C 23/16* (2013.01); *Y10T 137/6855* (2015.04)

(58) Field of Classification Search
CPC ...... B60C 23/16; B60C 23/10; B60C 23/105; B60C 23/00; B60C 23/01; B60S 5/04
USPC .......................................... 280/201; 152/416
See application file for complete search history.

(56) References Cited

U.S. PATENT DOCUMENTS

| | | | | |
|---|---|---|---|---|
| 4,545,405 A * | 10/1985 | LaBelle | .................. | F16K 17/06 137/524 |
| 5,012,954 A * | 5/1991 | Will | .......................... | B60S 5/04 141/330 |
| 5,127,804 A * | 7/1992 | Chappell | .................. | B62J 11/02 280/201 |
| 5,143,390 A * | 9/1992 | Goldsmith | ............... | B62J 11/02 222/105 |
| 5,316,055 A * | 5/1994 | Brimmer | .................... | B60S 5/04 141/17 |
| 6,135,474 A * | 10/2000 | Nakamura | ............. | B62K 11/00 280/216 |
| 6,189,905 B1 * | 2/2001 | Yelverton | .............. | B62K 25/08 280/201 |
| 2005/0206117 A1 * | 9/2005 | Temmerman | .......... | B62K 25/08 280/276 |
| 2009/0096184 A1 * | 4/2009 | Krudenscheidt | ...... | B60C 23/105 280/201 |
| 2012/0234130 A1 * | 9/2012 | Yu | .......................... | B62K 21/26 74/551.9 |
| 2014/0102562 A1 * | 4/2014 | Morales | ................ | F16K 7/0008 137/557 |
| 2014/0109728 A1 * | 4/2014 | McRorie, III | ............ | B60S 5/04 81/15.2 |
| 2014/0322031 A1 * | 10/2014 | Aghilone | .............. | B60C 23/006 417/15 |

OTHER PUBLICATIONS

"Brass Eagle Paintball CO2 Tank 3K Burst Disk," Brass Eagle, Inc., 2010, [retrieved on Nov. 11, 2013], 1 page. Retrieved from: www.liveinsane.com/p-19-brass-eagle-3k-3000-psi-co2-tank-valve-burst-disk.aspx#.Unw1DBZ97zl.
"Crossfire Unified Burst Disk—7000 psi," Crossfire, Inc., 2013, [retrieved on Nov. 11, 2013], 2 pages. Retrieved from: www.hustlepaintball.com/Crossfire-Unified-Burst-Disk-7000psi.
"Model 1584 Bleed or Drain Valve—Operation and Maintenance," Aqua Environment Co. Inc., 2009, [retrieved on Nov. 11, 2013], 1 page. Retrieved from: www.aquaenvironmentinc.com/om-sheets.html.

(Continued)

*Primary Examiner* — John Walters
*Assistant Examiner* — Brian Swenson
(74) *Attorney, Agent, or Firm* — Sheridan Ross P.C.

(57) ABSTRACT

Methods and systems for storing and dispensing compressed air are provided for inflating a tire. Specifically, a compressed air reservoir is integrated into a human-powered vehicle, such as a bicycle frame component, to provide for portable and convenient inflation of a bicycle tire.

8 Claims, 6 Drawing Sheets

(56) References Cited

OTHER PUBLICATIONS

"Model 504 & 504H Relief Valve—Operation and Maintenance," Aqua Environment Co. Inc., 2009, [retrieved on Nov. 11, 2013], 2 pages. Retrieved from: www.aquaenvironmentinc.com/om-sheets.html.

Quick Disconnect Set, 7500 psi. (QDM7SET), Breathing Air Systems, 2013, [retrieved on Nov. 11, 2013], 3 pages. Retrieved from: www.breathingair.com/products/quick-disconnect-set-7500-psi.

\* cited by examiner

METHOD AND SYSTEM FOR STORING AND DISPENSING COMPRESSED AIR

FIELD

The present disclosure relates generally to methods and systems for storing and dispensing compressed air. Specifically, methods and systems are provided for storing compressed air associated with a bicycle and dispensing compressed air into a bicycle tire.

BACKGROUND

Existing solutions used to inflate tires are inconvenient for a variety of reasons. A conventional air compressor requires an electrical outlet, but tire failure rarely occurs near an electrical outlet. More portable solutions have the capability to store compressed air and dispense it at a later time. However, these solutions are bulky and self-contained. Further, a hand pump may be used to inflate a tire, but it is time consuming, physically strenuous, and cumbersome. There has been a long-felt but unsolved need to conveniently inflate tires in accordance with embodiments of the present invention as shown and described herein.

SUMMARY

The present disclosure contemplates novel methods and systems for storing and dispensing compressed air. In certain embodiments of the present disclosure, the methods and systems specifically apply to human powered vehicles ("HPVs"), including bicycles. The term "bicycles" should not be limited to any particular type or arrangement of bicycle, however. Rather, the term includes mountain bicycles, touring bicycles, randonneur bicycles, hybrid bicycles, flat bar road bicycles, cyclo-cross bicycles, utility bicycles, roadster bicycles, Dutch bicycles, European city bicycles, freight bicycles, military bicycles, racing bicycles, time trial bicycles, triathlon, track bicycles, BMX bicycles, cruiser bicycles, cycle rickshaws, motorized bicycles, railbikes, or any other mode of transportation wherein inflatable tire systems are contemplated. Embodiments and features of the present invention may be employed in HPVs comprising fewer or greater than two wheels. For example, embodiments and features of the present invention may be provided with unicycles, hand-cycles (comprising, for example, three wheels), and novelty machines comprising any number of wheels.

HPVs and other modes of transportation use pressurized tires to translate force to a surface and provide various other functional benefits to a system. These tires may lose pressure in a variety of ways, causing a HPV or other modes of transportation to become immobile or generally impede mobility and rolling efficiency. First, a tire may lose pressure due to a puncture. Roads and other surfaces that tires travel on are rife with debris that may actually penetrate the tires and associated tubes. Additionally, "pinch flats" are known to occur in the absence of a foreign object penetrating a tire/tube, particularly in circumstances where the tire/rube is improperly installed, assembled, or inflated. The present disclosure contemplates various embodiments for storing, transporting, and dispensing compressed air into a tire or tube to retain a desired level of tire filtration. One of skill in the art will recognize that HPV tire systems are often provided as either a "clincher" assembly or a "tubeless" assembly. Clincher assemblies generally comprise a tube and a tire provided as separate components, each of which are designed to complement one or more wheel sizes or geometries. Tubeless assemblies, in contrast, generally comprise an inflatable tire of integrated constructed designed to be secured to a particular wheel structure. Embodiments of the present invention are contemplated for use with one or both of such systems.

Further, a tire may lose pressure through permeation. Tires have small imperfections, and they are not perfectly sealed. Tires will slowly lose pressure through these imperfections over time. Third, a slow leak may cause a tire to lose pressure. Impacts from external sources may cause a slow leak, but the tires do not lose pressure rapidly. The tires will slowly lose pressure over time. Fourth, impacts may cause a tire to lose pressure. When tires impact surfaces such as curbs or edges, they can experience a loss in pressure. Finally, a change in environmental conditions may cause a tire's internal pressure to fluctuate. These environmental conditions may include changes in altitude or temperature. These causes of pressure loss in tires are exemplary in nature and are not exhaustive.

Various embodiments of the present invention comprise methods, features, and systems for storing a fluid within a pre-existing vehicle component. For example, in certain embodiments, a particular portion of a bicycle frame houses a compressed fluid that may be dispensed into an additional and/or separate volume as desired. Although the present invention is not limited to bicycles or frames, it is known that bicycle frames frequently comprise interconnected tubular members. Such members are typically round or partially round in cross-section and include, for example, a top tube, a down tube, a seat tube, a seat post, seat stays, chain stays, forks, head tubes etc. Such frames and frame members are provided to support the weight of a user, transmit force (e.g. from crank arms, drive train, wheel(s), etc. to propel the vehicle) and generally give structure to the vehicle. Frames are known to be made of various metals including Cro-Moly, Aluminum, Titanium, and various alloys thereof, as well as carbon fiber. Frame members and tubes are often hollow so as to obtain the appropriate structural integrity while minimizing the weight of the vehicle. Embodiments of the present invention utilize previous hollow or unused portions of a vehicle to store and selectively dispensed a fluid, such as compressed $CO_2$ which is particularly useful for re-inflation of tires.

In various embodiments, an interior of a portion of a frame member houses a compressed fluid. The frame member further comprises means for inserting and dispensing the compressed gas, as will be shown and described herein. The present invention provides various benefits and improvements over known devices and systems, including the utilization of previously unused space, and providing a user with the ability to carry or transport greater tire re-filling capability.

In one embodiment, a portion of a frame (e.g. handlebar) comprises a pressure vessel. The pressure vessel comprises a portion of the interior of the handlebar volume, but may alternatively comprise the entire interior volume of the frame portion. The frame portion further comprises a refill port, such as a one-way valve through which one or more compressed gases may be inserted or re-filled in the pressure vessel. Additionally, a compressed air dispenser is provided, the dispenser comprising a selectively-actuatable feature for selectively releasing a quantity of gas from the pressure vessel. A gauge or other known instrumentation are provided in certain embodiments, so as to provide feedback to a user regarding a quantity of gas dispensed from or remaining within the pressure vessel. Various gas and pressure dispensation means are contemplated by the present invention, and no limitation with respect to the same is provided. Various pressure release valves, whether currently known or developed after the filing date of this invention are contemplated. Although preferred embodiments are provided herein, it will be recognized that the present invention is not limited to such features.

In at least one embodiment of the present disclosure, a compressed air reservoir stores compressed air. The compressed air reservoir is integrated into the structure of the HPV such that the embodiment is not self-contained, unlike other solutions. Other portable solutions are self-contained and need to be carried externally to the bicycle, either on the bicycle or by the user. The integration of the present invention benefits the user since the user does not need to remember to carry the compressed air reservoir or struggle with transporting a self-contained compressed air reservoir.

Various embodiments of the present disclosure include a refilling port, which provides the compressed air reservoir access to charging devices so that this embodiment of the present disclosure may store compressed air. Because some embodiments of the present disclosure comprise reusable compressed air reservoirs, the compressed air reservoir may take on a variety of shapes to suit storage locations, performance requirements, or any other parameter.

Further, various embodiments of the present disclosure include safety devices on the compressed air reservoir. These devices include—but are not limited to—safety valves and burst discs. Safety valves are provided in various embodiments to bleed off excessive pressure from the compressed air reservoir, and burst discs burst or rupture once excessive and/or predetermined pressure crosses a threshold pressure within a compressed air reservoir.

In certain embodiments of the present disclosure, a compressed air reservoir is provided within the handlebars of a HPV, such as within bicycle handlebars. Providing a compressed air reservoir in this manner allows a compressed air reservoir to be large enough to inflate or refill more than one tire. Where a system of the present invention is provided in a conventional bicycle frame, the compressed air reservoirs may be provided in the seat stays, the down tube, the chain stays, the seat tube, the top tube, the head tube, the fork, or any other location that may house the compressed air reservoir, either in addition to or in lieu of providing the same in the handlebars.

In various embodiments of the present disclosure, a user may access the stored compressed air inside of the compressed air reservoir through a valve, regulator or other components. A hose may be used to dispense and direct the compressed air to a desired location or component.

Systems and methods of the present disclosure provide for connection of a hose or similar feature to a valve stem, dispensation of compressed air from the compressed air reservoir by activating a valve or regulator, inflation of the tire, and deactivation of the valve or regulator. The inflation of the tire can be accomplished regardless of whether the systems or methods are employed near an electrical outlet. A further benefit is that the present disclosure is integrated into a HPV, saving the user from having to remember to carry a self-contained solution, and reducing waste associated with single-use compressed air cartridges, for example. The present invention is less strenuous and more convenient than a hand pump.

These and other advantages will be apparent from the disclosure contained herein. The above-described aspects, embodiments, objectives, and configurations are neither complete nor exhaustive. As will be appreciated, other aspects and embodiments of the disclosure are possible using, alone or in combination, one or more of the features set forth above or described in detail below. Further, the summary of the disclosure is neither intended nor should it be construed as being representative of the full extent and scope of the present disclosure. The present disclosure is set forth in various levels of detail in the summary of the disclosure, as well as, in the attached drawings and the detailed description of the disclosure and no limitation as to the scope of the present disclosure is intended to either the inclusion or non-inclusion of elements, components, etc. in this summary of the disclosure. Additional aspects of the present disclosure will become more readily apparent from the detailed description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
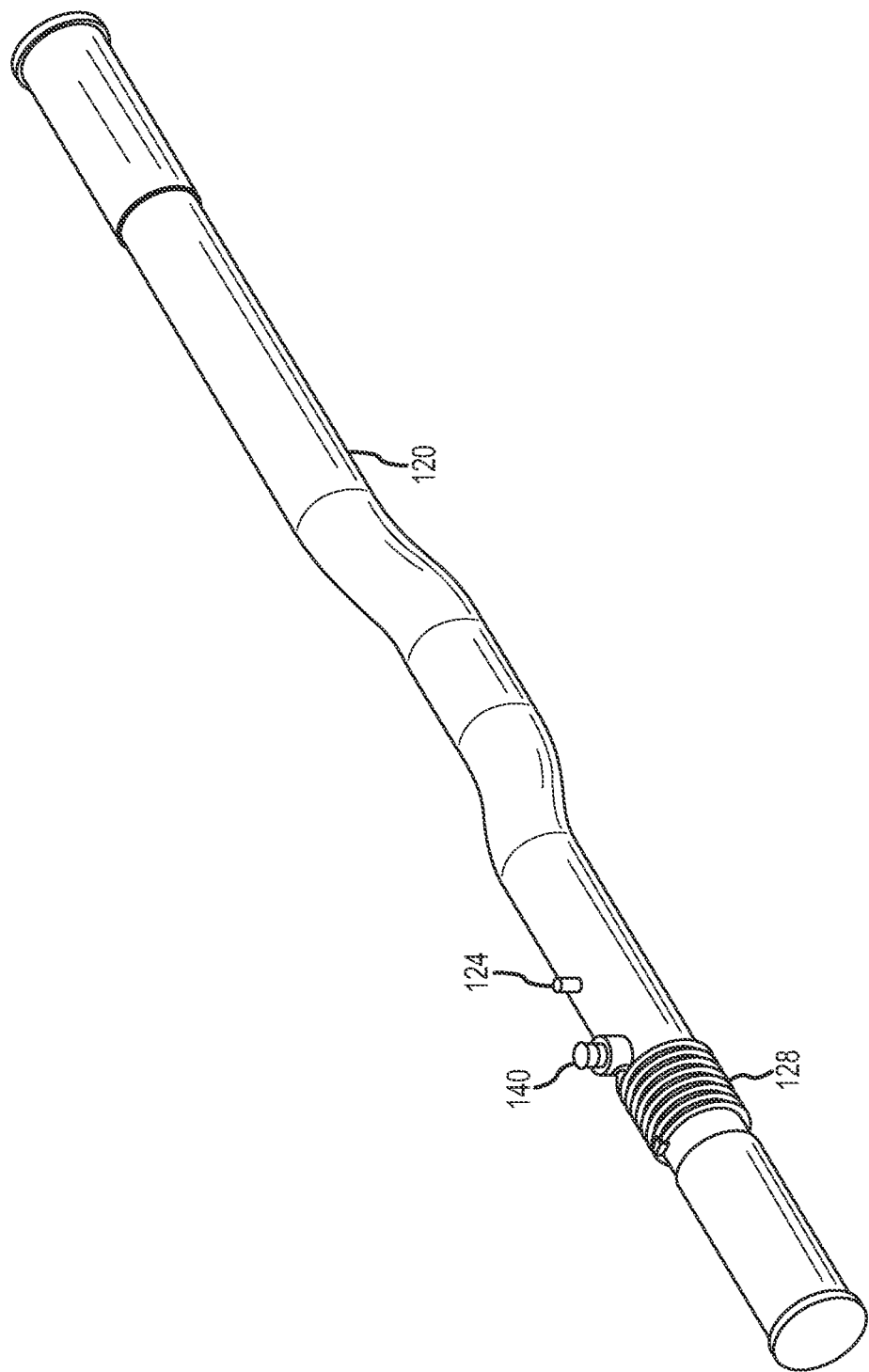
Figure 2:
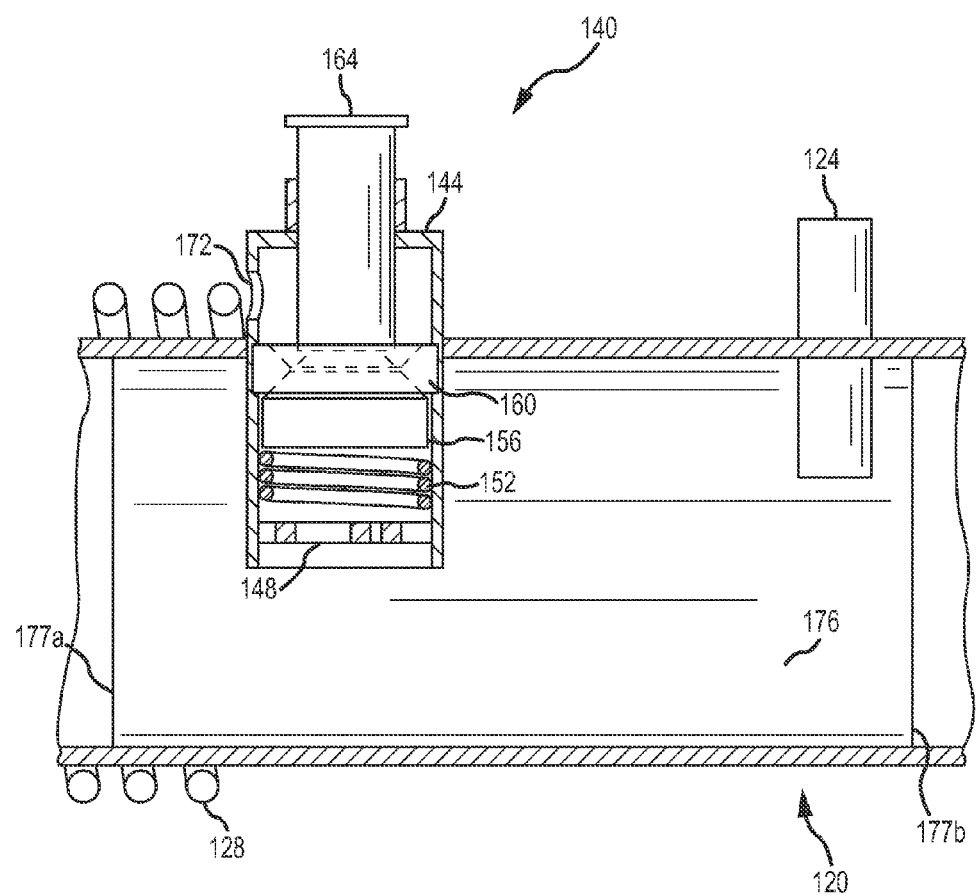
Figure 3:
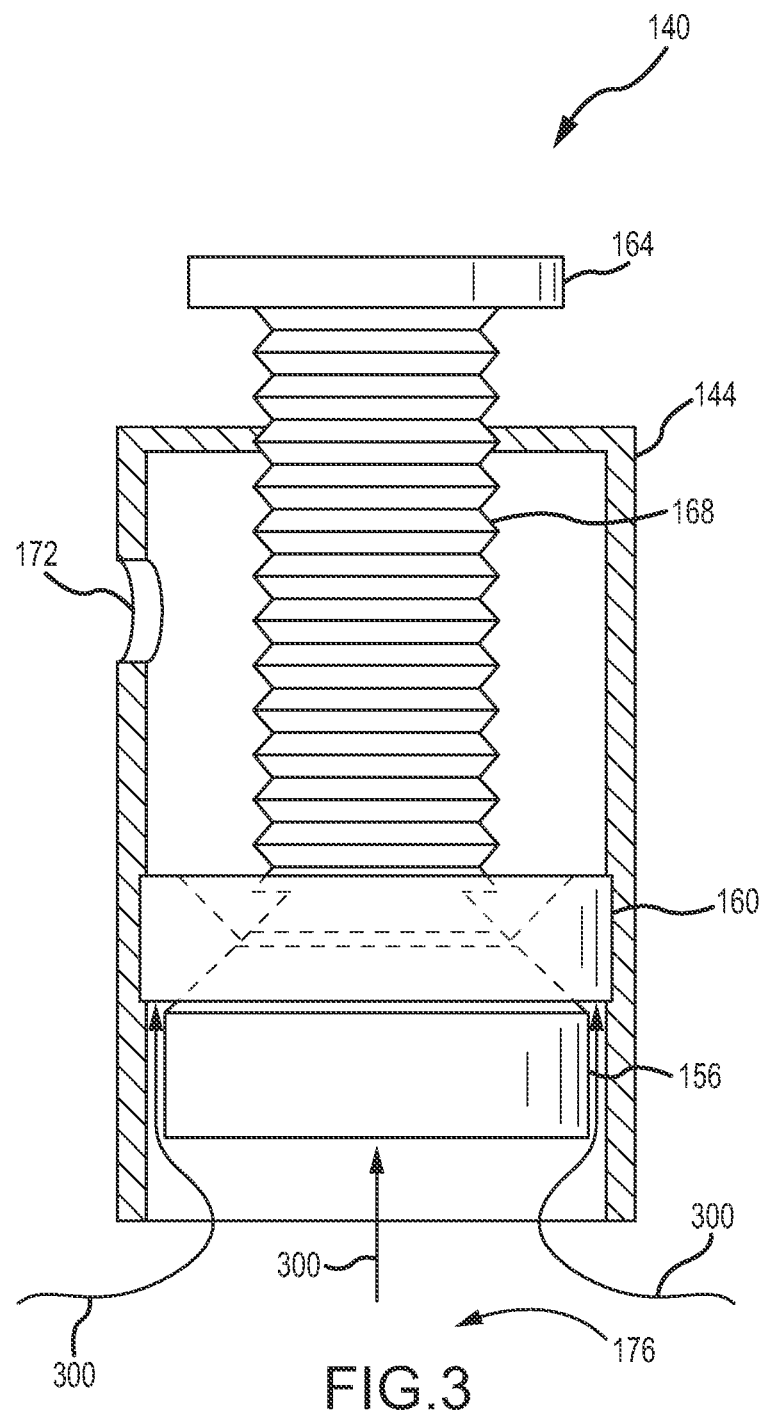
Figure 4:
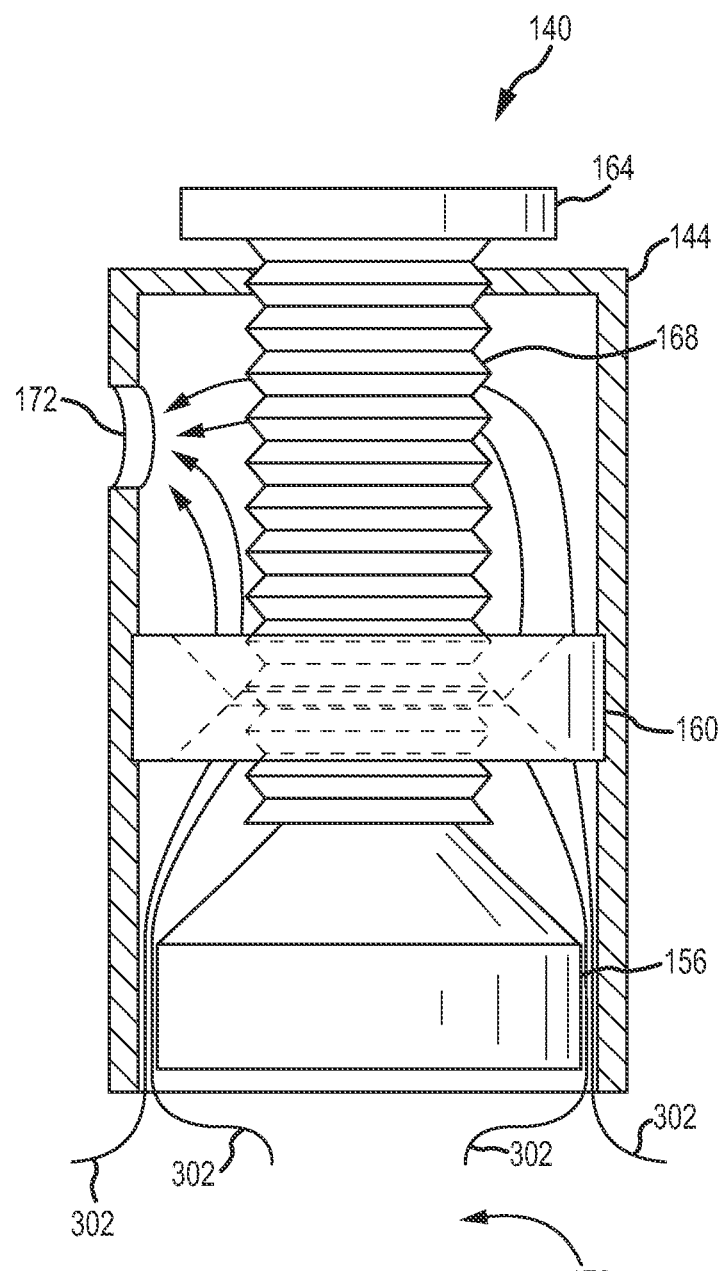
Figure 5:
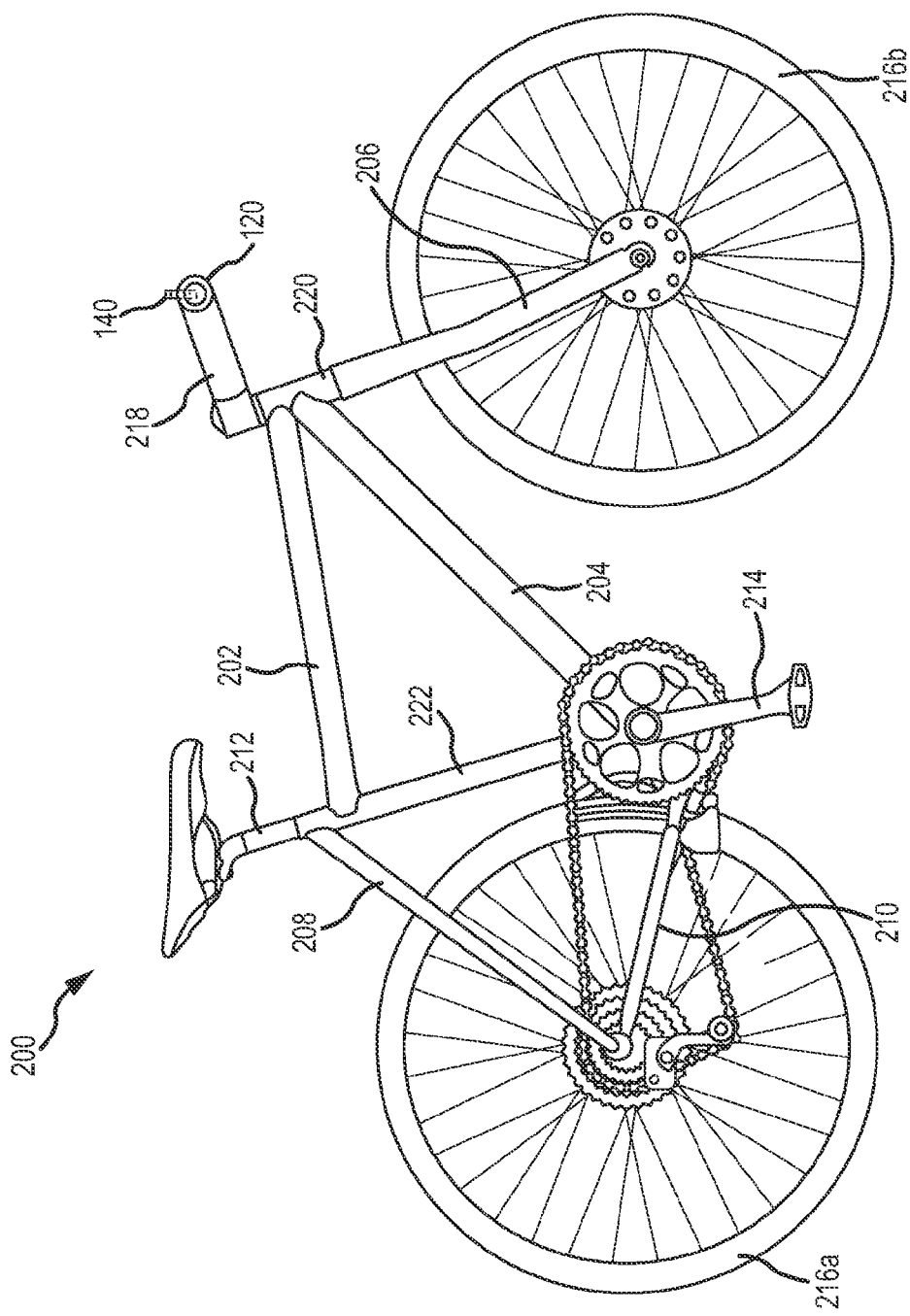
Figure 6:
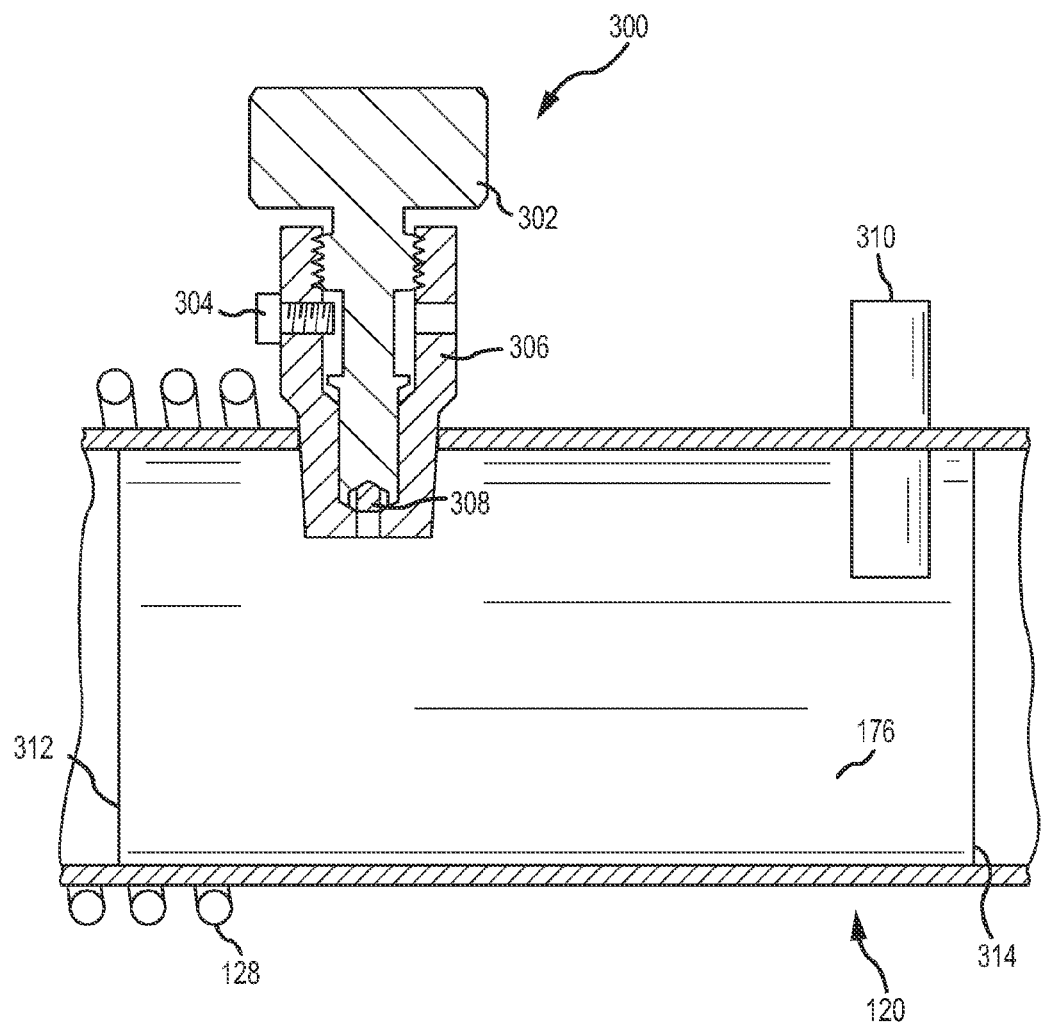

FIG. 1 is a perspective view of one embodiment of the present disclosure;

FIG. 2 is a cross sectional view of a fluid outlet according to one embodiment of the present disclosure;

FIG. 3 is a side view of a component of one embodiment of the present disclosure;

FIG. 4 is a side view of a component of one embodiment of the present disclosure;

FIG. 5 is a side view of one embodiment comprising a bicycle provided with a fluid outlet;

FIG. 6 is a cross sectional view of one embodiment of the present disclosure.

DETAILED DESCRIPTION OF THE DRAWINGS

The present disclosure has significant benefits across a broad spectrum of endeavors. It is the applicant's intent that this specification and the claims appended hereto be accorded a breadth in keeping with the scope and spirit of the disclosure despite what might appear to be limiting language imposed by the requirements of referring to the specific examples disclosed. To acquaint persons skilled in the pertinent arts most closely related to the present disclosure, an enabling embodiment of the method that, in some applications, illustrates a preferred mode now contemplated for putting the disclosure into practice is described herein by, and with reference to, the annexed drawings that form a part of the specification. The exemplary method is described in detail without attempting to describe all of the various forms and modifications in which the disclosure might be embodied. As such, the embodiments described herein are illustrative, and as will become apparent to those skilled in the arts, can be modified in numerous ways within the scope and spirit of the disclosure.

The Detailed Description is to be construed as exemplary only and does not describe every possible embodiment since describing every possible embodiment would be impractical, if not impossible. Numerous alternative embodiments could be implemented, using either current technology or technology developed after the filing date of this patent.

To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning Finally, unless a claim element is defined by reciting the word "means" and a function without the recital of any structure, it is not intended that the scope of any claim element be interpreted based on the application of 35 U.S.C. §517, sixth paragraph.

FIG. 1 is a perspective view of a component of a HPV according to one embodiment of the present disclosure. In various embodiments, the reservoir or pressure vessel 176 comprises an internal portion of a bicycle frame component, such as a substantially cylindrical internal portion of a handlebar member. In one particular embodiment, a "flat" (i.e. as opposed to dropped handlebars) handlebar assembly 120 is provided that is suitable for attachment to the stem of a bicycle. The assembly 120 is generally cylindrical in shape and at least partially hollow. As shown, a fluid outlet 140 is provided and spaced apart from a refilling port 124. In various embodiments, the refilling port 124 comprises a one-way valve to facilitate ingress and generally prevent egress of fluid from the port 124. In one particular embodiment, the refilling port comprises a quick disconnect, 7500 psi valve, such as that which is commercially available through Breathing Air Systems™.

The fluid outlet 140 and refilling port 124 are preferably provided through a sidewall of the frame portion 120 such that they provide points of egress and ingress from the pressure vessel 176, respectively. A conduit or hose 128 is further provided, the conduit 128 provided in fluid communication with a reservoir contained within the assembly 120, the fluid outlet 140, and a desired location such as a valve stem, or other interface, on a tire.

FIG. 2 is a cross sectional view of a portion of the handlebar assembly 120 comprising a fluid outlet 140 according to one embodiment of the present disclosure. The fluid outlet 140 comprises a body 144 to house various components and features of the fluid outlet 140. Located at one end of the body 144 is a base plate 148. The base plate 148 is interconnected to the inside wall of the body 144 and preferably allows communication of compressed air from a compressed air reservoir 176 contained within the handlebar assembly 120 to a tire. Such communication is achieved in one embodiment by providing an annular base plate 148 through which a fluid is allowed to flow through a central region. The base plate 144 further provides a surface for force communication with a spring 152.

A spring 152, such as a coil spring, is provided within the body 144 and is force-transmitting communication with the base plate 144 and a sealing element 156. The spring 152 is in contact with a bottom surface of the sealing element 156. The bottom surface of the sealing element 156 is a substantially flat surface in at least some embodiments. The top surface of the sealing element 156 is a frusto-conical shape, which allows an annular seal 160 to seat against the top surface of the sealing element 156. The seat between the top surface of the sealing element 156 and the annular seal 160 is an airtight interface.

An annular seal 160 is provided and is in selective communication with a sealing element to selectively open/close the fluid outlet 140. The annular seal 160 comprises a ramped internal feature for contacting sealing element 156. Sealing element 156 is interconnected to and translates with the outlet control 164. In certain embodiments, the outlet control 164 comprises a push-button feature, wherein depression of the outlet control 164 overcomes the force of the spring 152 and allows for fluid communication between a pressure vessel 176 and an outlet 172. In alternative embodiments, the outlet control 164 comprises a threaded feature wherein rotation of the outlet control 164 opens the fluid pathway. As shown in FIG. 2, a spring 152 biases the sealing element 156 upwardly toward a sealed position, without applying such a magnitude of force that would restrict downward movement of the sealing element 156 and outlet control 164, when such movement is intended. It will be recognized that the spring 152 and pressure differential between the pressure vessel 176 comprising a compressed gas and an outside environment will work together to bias the sealing element 156 toward a closed or sealed position.

The body 144 has an outlet or nozzle 172 located on a portion of the body 144 that is located external to the handlebars 120. The nozzle 172 allows communication of compressed air from the body 144 to the hose 128. The conduit 128 is not shown as connected in FIG. 2, but it will be recognized that the conduit 128 may be connected to the body 144 and nozzle 172 through a variety of means including, but not limited to, inlet nipples, male adapters, etc. In various embodiments, the conduit 128 is selectively removable from the handlebar assembly 120, such that it may be stored elsewhere.

A refilling port 124 is located on the handlebars 120. A portion of the refilling port 124 is outside of the handlebars 120 and a portion is inside of the handlebars 120, and the port 124 generally comprises a conduit for transmitting compressed air from one source or location to the internal volume 176 of the bar assembly 120. The refilling port 124 allows communication of compressed air from a charging device to the compressed air reservoir 176.

To illustrate various capabilities and benefits of the present invention, Table 1 provides various dimensions and weight data related to a typical or theoretical mountain bicycle handlebar assembly and a typical road bicycle assembly, such as may be employed by one or more embodiments of the present invention.

TABLE 1

Exemplary mountain bicycle and road bicycle dimensions and weights.

|  | Mountain Bike Bar | Road Bike Bar |
|---|---|---|
| Outer Diameter (mm) | 22.2 | 22.2 |
| Tube Thickness (mm) | 0.794 | 0.794 |
| Length (mm) | 533.4 | 1016 |
| Volume of metal (mm$^3$) | 28506 | 54297 |
| Volume of metal (m$^3$) | $2.85(10^{-5})$ | $5.0(10^{-5})$ |
| Steel Density (kg/m$^3$) | 8000 | 8000 |
| Mass (kg) | 0.228 | 0.434 |
| Weight (N) | 2.237 | 4.261 |
| Weight (lb) | 0.503 | 0.959 |

The information provided in Table 1 can be used to determine theoretical storage capacities of a compressed gas, such as $CO_2$. From such theoretical storage capacities, it is possible to determine how many "refills" or many "tires" may be filled from a compressed gas stored within such features of a vehicle frame. As used herein, the term "performance" with respect to an inflation system generally relates to the capacity of gas the system can store and/or the volume of inflatable tires the system can replenish. To convert the dimensions and weights of the typical mountain bicycle handlebar and the typical road bicycle handlebar into performance metrics, Table 2 below summarizes the theoretical performance of the mountain bicycle handlebar and the road bicycle handlebar as if they were a compressed air reservoir 176. For reference, a 16 g disposable $CO_2$ canister, such as those commercially available from Genuine Innovations®, with a volume of approximately 6136 $mm^3$ can fill a 700×23c bicycle tire to 130 psi, or 1.5 tires at 90 psi. Based on the performance of a 16 g $CO_2$ canister, the handlebars of the exemplary mountain bicycle can inflate as many as 50 bicycle tires, and the handlebars of the exemplary road bicycle can inflate as many as 96 bicycle tires.

TABLE 2

Theoretical performance based on exemplary mountain bicycle and road bicycle dimensions and weights.

| | Volume ($mm^3$) | Volume ($m^3$) | Weight of $CO_2$ (lb) | Maximum Possible Inflations |
|---|---|---|---|---|
| Mountain Bicycle | 206,931 | 33.7 | 1.2 | 50 |
| Road Bicycle | 394,155 | 64.2 | 2.3 | 96 |

As a practical consideration, an additional 1.2 or 2.3 lbs of $CO_2$ may be too heavy. Therefore it is useful to compute the number of inflations in relation to the length of the compressed air reservoir 176. Holding the radial dimension of the handlebars constant, the number of inflations, $N=2.4L$ where $L$ is the length of the compressed air reservoir in inches.

The material of the handlebars 120 may be that which is typically used for a compressed air reservoir. These materials include steel and aluminum. Further, the handlebars 120 may be made of carbon fiber or made of steel or aluminum wrapped in carbon fiber. These materials do not represent an exhaustive list of materials that the handlebars 120 or compressed air reservoir 176 may be made from.

The performance of the exemplary handlebars 120 in Table 2 is theoretical and does not incorporate real-world safety concerns. For example, the 16 g $CO_2$ canisters are typically filled to 34% of theoretical capacity. Therefore, the column titled "Maximum Possible Inflations" would be multiplied by 0.34 to represent a typical filling of a $CO_2$ canister.

A safety consideration of pressurizing a compressed air reservoir 176 is excessive pressurization. Excessive pressurization can lead to a catastrophic failure of a pressure vessel. Excessive pressurization can result from charging devices or even simple heating of the handlebars a pressure vessel, causing the compressed air to increase in pressure. It is contemplated that pressure vessels may only be filled to a portion of their capacity. For example, in certain embodiments, pressure vessels of the present invention are filled to only approximately ⅓ of their total capacity, thus providing a factor of safety against bursting of the vessel. Additionally, various safety devices and features are contemplated.

For example, safety valves and copper burst discs 177a, 177b are contemplated for provision with pressure vessels of the present invention. Safety valves comprise valves that bleed off excessive pressure once the pressure inside of the compressed air reservoir crosses a pressure threshold. Similarly, copper burst discs 177a, 177b comprise thin discs of copper that will burst or rupture once the pressure inside of the compressed air reservoir crosses a pressure threshold. These devices may be employed in embodiments of the present disclosure to protect against excessive pressurization of the compressed air reservoir.

In an alternative embodiment of the present invention, a commercial valve is provided as the fluid outlet 140 and refilling port 124 to charge the compressed air reservoir 176 with an alternative gas such as $CO_2$. Copper burst discs typically have a burst range of 2200 to 2800 psi. The commercial valve is contemplated as having a rating of up to 7000 psi to maintain a safety factor of approximately 2.5 over a typical copper burst disc. If the compressed air reservoir 176 were filled to 34% with $CO_2$, and the temperature were allowed to rise to 120° F., then the pressure inside of the compressed air reservoir 176 would be 1200 psi. With 7000/1200=5.8, the commercial valve should maintain a safety factor of 5.8 over the expected pressure inside of the compressed air reservoir 176.

Referring now to FIGS. 3-4, an embodiment of a fluid outlet 140 is provided wherein the outlet control 164 comprises threaded features. The outlet control 164 comprises external threads in communication with female threads provided on the body 144 and/or the annular seal 160. Rotation of the threaded outlet control 164 moves integrally connected sealing element 156 in and out of contact with the annular seal 160. As shown, an outlet control FIG. 3 is a side view of one embodiment of an outlet control 164 wherein the sealing element 156, which is integrally connected to the outlet control 164 is rotated into sealing contact with the annular seal 160. The annular seal 160 comprises an angled or ramped interior dimension so as to securely interface with the sealing element 156. As mentioned above, the interior portion of the annular seal 160 is threaded and is selectively interconnected to an outlet control 164. The outlet control 164 has outlet control threads 168 which allow an annular seal 160 with threaded portion to selectively interconnect to the outlet control 164. In this fashion, rotation of the outlet control 164 controls the vertical displacement of the sealing element 156. In FIG. 3, the sealing element 156 is at its uppermost vertical displacement against the surface of the sealing annular seal 160. The interface between the annular seal 160 and the sealing element 156 is airtight in this arrangement, retaining the compressed air below the annular seal 160. Accordingly, gas flow 300 from within the pressure vessel 176 is substantially prevented from reaching the outlet 172 and is thus contained.

FIG. 4 is a side view of the outlet control 164 wherein the sealing element 156 is positioned out of contact with the annular seal 160. As shown, the outlet control 164 has been rotated, vertically displacing the sealing element 156 from the annular seal and creating a fluid flow path 302 from the pressure vessel 176 to the outlet 172. In the depicted arrangement, fluid flow 302 is enabled and may be directed to an additional vessel (e.g. tire, inner tube) requiring inflation.

FIG. 5 is a side view of a bicycle 200 with the fluid outlet 140 located in the handlebars 120. In this particular embodiment, the handlebars 120 comprise a compressed air reservoir for selective inflation of objects, such as tires 216a, 216b and associated tubes. As discussed, however, pressure vessels may be provided in various portions of a HPV frame. For example, it is contemplated that one or more pressure vessels be provided in any one or more of a top tube 202, down tube 204, fork 206, head tube 220, seat tube 222, seat post 212, seat stay 208, chain stay 210, crank arm 214, stem 218, etc.

FIG. 6 is a cross-sectional view of one embodiment of the present invention comprising a pressure vessel 176 provided in a portion of bicycle handlebars 120, wherein the pressure vessel is in fluid communication with a bleed or drain valve 300. Drain valve 300 comprises a screw 302, outlet 304, screw body 306 and valve stop 308. Manual manipulation of the screw 302 allows fluid to be released from the outlet 304, such as when required to fill a tire. The drain valve 300, in certain embodiments, comprises a commercially available drain valve such as the model 1584 Bleed or Drain Valve available through Aqua Environment™ and Global Mfg. Corp.™. The pressure vessel 176 is bounded at one end by a relief valve 312 and at the other end by a burst disc 314. In various embodiments, the relief valve comprises a valve to release or relieve a certain amount of pressure and maintain a certain pressure ceiling within the pressure vessel 176. In one embodiment, the relief valve comprises commercially available relief valve such as the model 504 & 504H Relief Valve available through Aqua Environment™ and Global Mfg. Corp.™. In various embodiments, one or more burst discs 314 are contemplated as comprising commercially available burst or rupture discs rated to approximately 7,000 psi. One example of such a burst disc is commercially offered through Landa® (SKU 98021920).

A number of variations and modifications of the disclosure can be used. It would be possible to provide for some features of the disclosure without providing others. The present disclosure, in various aspects, embodiments, and configurations, includes components, methods, processes, systems and/or apparatus substantially as depicted and described herein, including various aspects, embodiments, configurations, sub-combinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A handlebar assembly for a bicycle including an inflation device, the inflation device comprising:
    a pressure vessel having a predetermined volume adapted to store a pressurized fluid;
    an outlet in fluid communication with said pressure vessel;
    a user-actuated control valve for selectively directing pressurized fluid from said pressure vessel to an external volume comprising a pressure lower than that of the pressurized fluid;
    a fluid inlet port for directing a pressurized fluid into said pressure vessel, said fluid inlet port being spaced apart from said outlet;
    a nozzle in fluid communication with said outlet;
    a flexible conduit comprising a first end, a second end, and a length, said first end provided in fluid communication with said outlet and said second end interconnected to said nozzle such that said conduit and said nozzle are adapted to convey pressurized fluid from said pressure vessel to an external volume;
    the pressure vessel comprising a pressure relief valve and at least one burst disc;
    the pressure relief valve comprising a separate component from said control valve, and wherein the pressure relief valve is operable to selectively release pressure from within the pressure vessel;
    the at least one burst disc provided separate from the outlet, the user-actuated control valve, and the fluid inlet port, and wherein the at least one burst disc at least partially defines a boundary of the predetermined volume of the pressure vessel and comprises a maximum allowable pressure of not more than 7,500 psi.

2. The handlebar assembly of claim 1, wherein the at least one burst disc comprises a burst rating of not more than 7,000 psi.

3. The inflation handlebar assembly of claim 1, wherein said pressure vessel is provided within a handlebar portion of a bicycle.

4. The handlebar assembly of claim 1, wherein said user-actuated control valve is in communication with said outlet, such that said user-actuated control valve extends from an internal portion of the pressure vessel.

5. The handlebar assembly of claim 1, wherein said user-actuated control valve comprises a rotatable threaded member having a first end and a second end, said first end comprising a user interface and said second end comprising a sealing element positionable between at least an open and a closed position.

6. The handlebar assembly of claim 1, wherein said user-actuated control valve comprises a translatable element having a first end and a second end, said first end comprising a user interface and said second end comprising a frustoconical sealing element positionable between at least an open and a closed position.

7. A handlebar assembly for a bicycle, comprising:
    an elongate handlebar member comprising a length and an internal volume;

said elongate handlebar member comprising a pressure vessel having a predetermined volume adapted to store a pressurized fluid;

an outlet in fluid communication with said pressure vessel;

a user-actuated control valve for selectively directing pressurized fluid from said pressure vessel to an external volume comprising a pressure lower than that of the pressurized fluid, wherein said user-actuated control valve comprises a rotatable threaded member having a first end and a second end, said first end comprising a user interface and said second end comprising a sealing element positionable between at least an open and a closed position;

a fluid inlet port for directing a pressurized fluid into said pressure vessel, said fluid inlet port being spaced apart from said outlet;

a nozzle in fluid communication with said outlet;

a flexible conduit comprising a first end, a second end, and a length, said first end provided in fluid communication with said outlet and said second end interconnected to said nozzle such that said conduit and said nozzle are adapted to convey pressurized fluid from said pressure vessel to said external volume; and a pressure relief member in the form of a burst disc, the burst disc provided as a separate component from the outlet and the nozzle and provided at a boundary of the predetermined volume of the pressure vessel, and comprising a predetermined burst strength.

8. The handlebar assembly of claim 7, wherein said sealing element comprises a frustoconical sealing element positionable between at least an open and a closed position.

* * * * *